United States Patent
Kwon

(10) Patent No.: US 7,655,353 B2
(45) Date of Patent: Feb. 2, 2010

(54) BATTERY

(75) Inventor: Teak Hyen Kwon, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 623 days.

(21) Appl. No.: 11/411,227

(22) Filed: Apr. 26, 2006

(65) Prior Publication Data

US 2006/0263685 A1      Nov. 23, 2006

(30) Foreign Application Priority Data

Apr. 26, 2005    (KR) .................. 10-2005-0034743

(51) Int. Cl.
  *H01M 2/02*    (2006.01)
  *H01M 2/08*    (2006.01)
(52) U.S. Cl. ..................... 429/175; 429/185
(58) Field of Classification Search ............. 429/174, 429/175, 185
  See application file for complete search history.

(56) References Cited

U.S. PATENT DOCUMENTS

| | | | |
|---|---|---|---|
| 4,544,078 A * | 10/1985 | Arenas et al. ........... | 429/174 X |
| 6,562,508 B1 * | 5/2003 | Satoh et al. ............. | 429/175 X |
| 6,638,661 B2 * | 10/2003 | Inoue et al. ............. | 429/175 X |
| 6,746,798 B1 * | 6/2004 | Hiratsuka et al. ....... | 429/185 X |
| 2004/0137319 A1 * | 7/2004 | Warchocki et al. ......... | 429/175 |
| 2006/0099501 A1 * | 5/2006 | Kim et al. ................. | 429/174 |

FOREIGN PATENT DOCUMENTS

JP          63-239763        10/1988

OTHER PUBLICATIONS

LiIon special report Feb. 7, 2000 "Thinner Li-Ion Batteries Power Next-Generation Portable Devices" Electronic Design, vol. 48 No. 3, pp. 1-5.

* cited by examiner

*Primary Examiner*—Stephen J. Kalafut
(74) *Attorney, Agent, or Firm*—Lee & Morse, P.C.

(57) ABSTRACT

A battery including a case defining a cavity for housing an electrode assembly, the case having an opening for receiving the electrode assembly, and a cap plate attached to the case to cover the opening, the cap plate including a welded portion that is thicker than a major area of the cap plate.

18 Claims, 4 Drawing Sheets

BATTERY

BACKGROUND OF THE INVENTION

1. Field of the Invention

The present invention relates to a battery. More particularly, the present invention relates to a battery configured to have an increased power capacity, the battery having a battery case housing an electrode assembly and an electrolyte, and a cap assembly including a cap plate for covering the battery case.

2. Description of the Related Art

Batteries are employed in a wide variety of equipment including, to name just a few, vehicles, e.g., electric and hybrid vehicles, portable power tools, electronics, etc. Portable compact electronic devices, e.g., cellular phones, laptop computers, camcorders, etc., are being widely developed and produced. Such portable electronic devices typically include an internal battery pack to allow continuing operation even when no external power supply is available. Such a built-in battery pack typically includes at least one unit battery inside and provides the electronic device with a predetermined level of voltage over a reasonable period of time.

Batteries are generally classified as primary or secondary batteries. Primary batteries are commonly known as single-use batteries, while secondary batteries are commonly known as rechargeable batteries. Both primary and secondary batteries may be suitable for use in portable electronic devices. However, secondary batteries are widely adopted because they can be reused and may be, therefore, more economical than single-use batteries. Secondary batteries have been developed using a wide variety of technologies.

Battery technologies currently favored for portable electronic devices include nickel cadmium (Ni—Cd) batteries, nickel metal hydride (Ni-MH) batteries, lithium (Li) batteries, etc. The Li batteries have, in particular, been widely employed in the latest generation of electronics devices. A Li battery may have an operation voltage of 3.6V, which is about three times the operation voltage of comparable Ni—Cd or Ni-MH batteries. The Li battery may exhibit a relatively high energy density per unit weight. In a typical Li battery, a lithium-based oxide may be used as a positive electrode activation material, and a carbon-based material may be used as a negative electrode activation material. Li batteries may be classified as liquid electrolyte batteries and polymer electrolyte batteries, depending on the electrolyte used therein. Liquid electrolyte batteries are also known as lithium ion (Li-ion) batteries and polymer electrolyte batteries are also known as Li polymer batteries. The Li battery may be manufactured in various shapes, e.g., cylindrical can types, rectangular or prismatic can types, pouch types, etc.

A typical battery may have an electrode assembly, a battery case for housing the electrode assembly and electrolyte injected inside the battery case to give mobility to charge carriers, e.g., ions. The electrode assembly may include a positive electrode plate on which a positive activation material is coated, a negative electrode plate on which a negative activation material is coated and a separator interposed between the positive and negative electrode plates. The separator may serve to prevent short circuits between the positive and negative electrode plates, and to allow only charge carriers to pass. The width of the separator of the electrode assembly may be larger than the widths of the electrode plates, in order to prevent the electrode plates from making contact with each other.

The electrode assembly of the battery may be fabricated by stacking the positive and negative electrode plates with the separator interposed therebetween, and the resulting structure may be wound into a jelly roll configuration. Positive and negative electrode taps may extend from the positive and negative electrode plates, respectively, in order to allow electrical connections to the electrode plates.

One of the positive and negative electrode taps may be connected to the cap plate of the cap assembly. The cap plate may be electrically connected to the battery case, so that the battery case may act as an electrode terminal. The other of the positive and negative taps, i.e., a tap of the opposite polarity, may be connected to another electrode terminal, which may be insulated from and pass through the cap assembly.

The cap assembly may include the cap plate, which may be assembled to the battery case to cover it. The cap plate may be welded to the battery case. The cap plate may cover an opening in the battery case through which the electrode assembly is installed.

The cap assembly may further include an electrode terminal passing therethrough, and a gasket installed between the cap plate and the electrode terminal for electrically insulating them from each other. The cap assembly may also include an insulation plate providing insulation between the cap plate and the electrode tap of opposite polarity, and a terminal plate installed in a lower portion of the insulation plate and connected to the electrode terminal.

The electrolyte may be injected into the battery case after the electrode assembly is placed in the battery case. The electrolyte allows charge carriers, e.g., ions, to travel between the positive and negative electrode plates. The electrolyte may occupy all of the remaining volume within the battery case.

Battery capacity is determined by a number of design factors including, e.g., the battery technology (chemistry) employed, the sizes of the positive and negative electrode plates, the electrolyte, etc. For a given battery technology, battery capacity is generally limited by the size of the battery. Accordingly, where the size of the battery is limited by, e.g., the design limitations of the device it is intended to power, it may be difficult to increase the battery capacity.

For example, if the amount of the electrolyte in the battery is insufficient, the capacity of the battery may be reduced. Further, in the case of a secondary battery, which may be discharged and charged numerous times, the capacity of the secondary battery may be reduced over time if the electrolyte begins to deteriorate with use. Increasing the size of the battery case to provide a sufficient amount of electrolyte may not be possible if the design requirements of the electronic equipment do not allow for a larger battery. Moreover, reducing the size, i.e., volume, of the charge-generating positive and negative electrode plates may allow for more electrolyte, but may reduce the overall capacity of the battery. Therefore, there is a need for a battery that maximizes the available electrolyte volume without increasing the external dimensions of the battery or reducing the size of the charge-generating elements therein.

One possible approach to increasing the internal volume of the battery is to reduce the thickness of the cap plate, i.e., thin the inner surface of the cap plate. However, if the cap plate is welded to the battery case, reducing the thickness of the cap plate may make it difficult to weld the cap plate to the battery case. In particular, the cap plate may be damaged by the welding process, even if a low power welding apparatus is employed, leaks may develop at the welded seams due to the thinning of the cap plate, etc.

SUMMARY OF THE INVENTION

The present invention is therefore directed to a battery, which substantially overcomes one or more of the problems due to the limitations and disadvantages of the related art.

It is therefore a feature of an embodiment of the present invention to provide a battery in which the internal volume is increased by thinning an inner surface of the cap plate.

It is therefore another feature of an embodiment of the present invention to provide a battery having a thin cap plate and configured to allow the cap plate to be welded to the battery case.

At least one of the above and other features and advantages of the present invention may be realized by providing a battery including a case defining a cavity for housing an electrode assembly, the case having an opening for receiving the electrode assembly, and a cap plate attached to the case to cover the opening, the cap plate including a welded portion that is thicker than a major area of the cap plate.

The welded portion may be welded to the case. The welded portion may include a rib formed at an edge of the cap plate, the rib protruding from an inner surface of the cap plate.

An inside surface of the case along the opening may have a stepped portion having a predetermined height, and a lower end of the rib may be fitted in the stepped portion. A thickness of the edge having the rib may be substantially equal to the predetermined height, such that an upper surface of the cap plate is substantially even with an upper edge of the case. A thickness of the edge having the rib may be within a range of about 0.8 mm to about 0.9 mm. The cap plate may have an electrolyte injection hole and a reinforcing portion formed around a circumference of the electrolyte injection hole, and the reinforcing portion may protrude from an inner surface of the cap plate and is thicker than the major area of the cap plate. A thickness of the reinforcing portion may be substantially equal to a thickness of the edge having the rib.

The thickness of a major area of the cap plate may be within a range of about 0.4 mm to about 0.8 mm. The cap plate may include an electrolyte injection hole and the welded portion may be welded to a plug sealing the electrolyte injection hole. The cap plate may include an electrolyte injection hole and a reinforcing portion formed around a circumference of the electrolyte injection hole, the reinforcing portion may protrude from an inner surface of the cap plate, and the reinforcing portion may be the welded portion.

An inside surface of the case along the opening may have a stepped portion having a predetermined height, an edge of the cap plate may be fitted in the stepped portion, and a thickness of the edge of the cap plate may be substantially equal to a thickness of the major area of the cap plate. The case may be rectangular.

At least one of the above and other features and advantages of the present invention may also be realized by providing a battery including a case defining a cavity for housing an electrode assembly, the case having an opening for receiving the electrode assembly, and a cap plate covering the opening, wherein a thickness of a major area of the cap plate is a predetermined thickness and at least one region of the cap plate has a first thickness greater than the predetermined thickness.

The cap plate may include an edge and an electrolyte hole, the edge may be welded to the case, and a thickness of the cap plate at the edge may be the first thickness. The cap plate may have a ribbed structure formed at the edge, the ribbed structure protruding from the cap plate towards a center of the battery, and a total thickness of the cap plate at the edge may be the first thickness. The case may have a recess formed along an inner surface of the case around a circumference of the opening, the edge may be disposed in the recess, and the thickness of the cap plate at the edge may be substantially equal to a height of the recess.

The case may have a recess formed along an inner surface of the case around a circumference of the opening, a height of the recess being less than the first thickness, an edge of the cap plate may be disposed in the recess and may be welded to the case, and a thickness of the cap plate at the edge may be substantially equal to the height of the recess. The thickness of the cap plate at the edge may be substantially equal to the predetermined thickness. The cap plate may include an electrolyte hole and a reinforcing portion formed around a circumference of the electrolyte hole, and a thickness of the reinforcing portion may be the first thickness.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1:
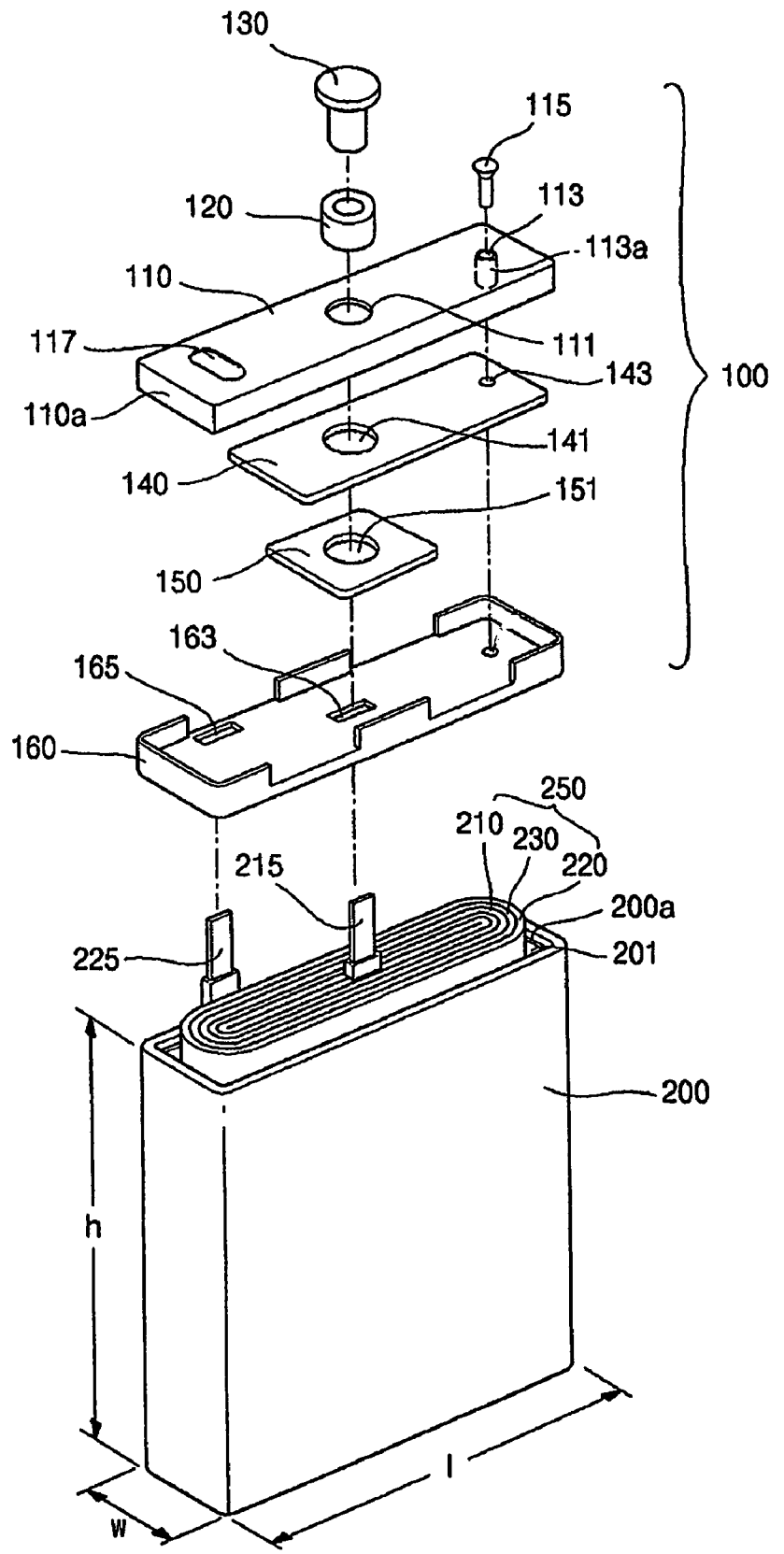
FIG. 1 illustrates an exploded perspective view of a battery according to a first embodiment of the present invention.

Korean Patent Application No. 10-2005-0034743, filed on Apr. 26, 2005, in the Korean Intellectual Property Office, and entitled: "Secondary Battery," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions are exaggerated for clarity of illustration. It will also be understood that when a layer is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

A battery according to the present invention may include a cap plate having a reduced thickness in a major area thereof, and thus it may be possible to increase the amount of electrolyte injected into the battery case. In addition, the cap plate may include thicker portions, e.g., ribs of a predetermined thickness, which may serve to strengthen welds around an electrolyte injection hole and/or between the cap plate and the battery case. Thus, it may be possible to reduce or prevent defects in the welds and resultant leakage of the electrolyte from the battery.

Figure 2:
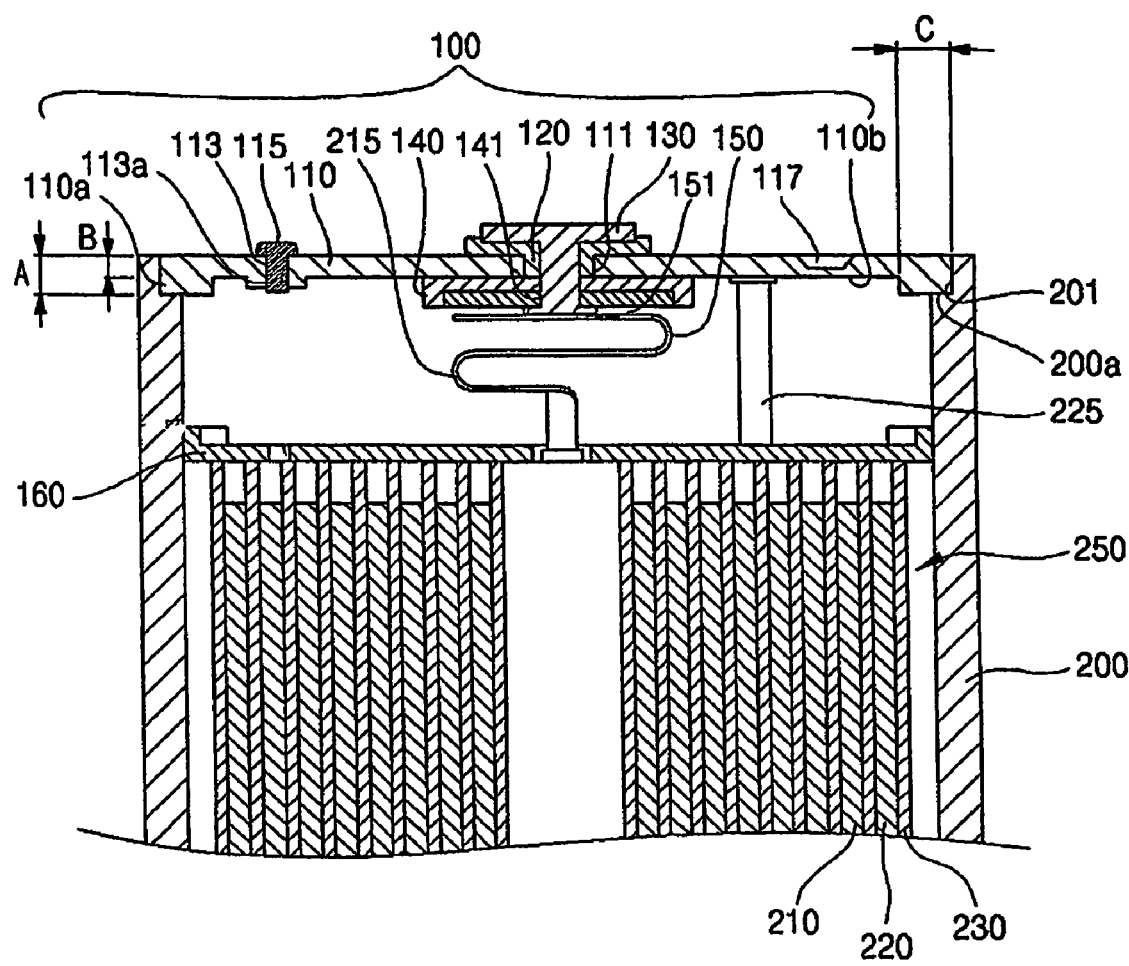
FIG. 2 illustrates a partial cross-section of the battery of FIG. 1.
Figure 4:
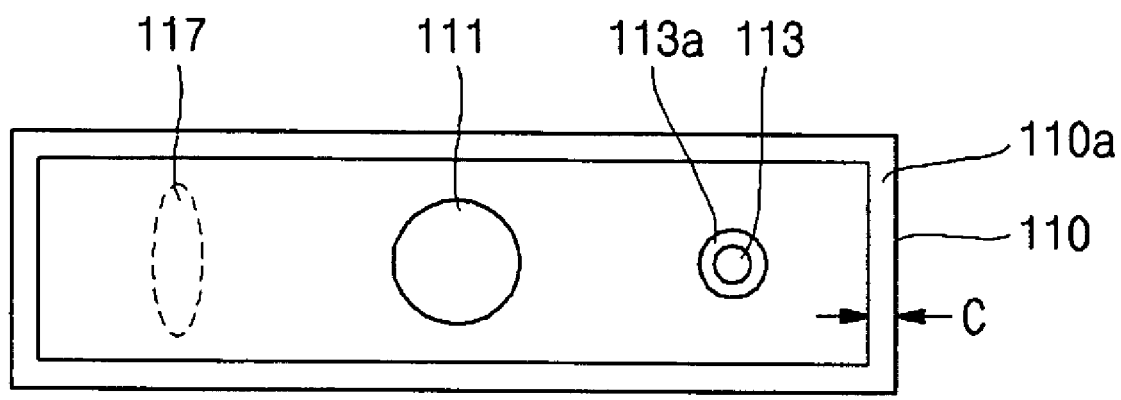
FIG. 4 illustrates a plan view of an inner surface of a cap plate of FIGS. 1 and 2.

FIG. 1 illustrates an exploded perspective view of a battery according to a first embodiment of the present invention, FIG. 2 illustrates a partial cross-section of the battery of FIG. 1 and FIG. 4 illustrates a plan view of an inner surface of a cap plate of FIGS. 1 and 2. Referring to FIGS. 1, 2 and 4, the battery may include a battery case 200, e.g., a can, having an opening 201 on one side, e.g., the top in FIGS. 1-2. The battery may be, e.g., a secondary battery. The battery may include an electrode assembly 250 disposed inside the battery case 200. A cap assembly 100 may be arranged at the opening 201 of the battery case 200 to cover it. The cap assembly 100 may be attached to the battery case 200 by welding, e.g., laser welding, a cap plate 110 of the cap assembly 100 to the battery case 200.

The battery case 200 may have a rectangular shape, with the opening 201 occupying a portion or all of one side. The battery case 200 may be made of a metallic material, so that it may function as an electrode terminal. The battery case 200 may be made of, e.g., an iron-based material such as stainless steel, aluminum or an aluminum alloy, etc. Where aluminum or an aluminum alloy is used, such a material offers light weight, good conductivity and high corrosion resistance.

The electrode assembly 250 may include a first electrode plate 210 to which a first electrode tap 215 is attached, a second electrode plate 220 to which a second electrode tap 225 is attached and a separator 230 interposed therebetween. The first and second electrode plates 210, 220 and the separator 230 may be stacked and wound into a jelly roll configuration. The first and second electrode taps 215, 225 may extend from one side of the electrode assembly 250, e.g., the upper side in FIGS. 1-2. The first and second electrode plates 210, 200 may function as either positive or negative electrode plates, depending on the particular design requirements of the battery. For example, the first electrode plate 210 may be a positive electrode plate and the second electrode plate 220 may be the negative electrode plate, or this arrangement may be reversed so that the first electrode plate 210 may be a negative electrode plate and the second electrode plate 225 may be a positive electrode plate.

The cap assembly 100 may include the cap plate 110, an insulation plate 140, a terminal plate 150 and an electrode terminal 130. The cap plate 110 may be formed of, e.g., a metallic plate, and may have a size and shape corresponding to the opening 201 of the battery case 200. A through-hole 111 may be formed in the cap plate 110, e.g., at the center thereof, for accommodating the electrode terminal 130. A gasket 120 having, e.g., a tubular shape, may be installed around the outer circumference of the electrode terminal 130 to insulate between the electrode terminal 130 and the cap plate 110. An electrolyte injection through-hole 113 may be formed in the cap plate 110, e.g., at a side thereof, to allow for injection of the electrolyte into the battery after the cap assembly 100 has been attached to the battery case 200. A plug 115 may be provided to seal the electrolyte injection through-hole 113. The plug 115 may be any suitable shape including, e.g., spherical, pin shaped, etc.

The insulation plate 140 may be made of an insulation material similar to the gasket 120, and may be installed along the lower surface of the cap plate 110. The insulation plate 140 may have a through-hole 141 corresponding to the through-hole 11 of the cap plate 110, for accommodating the electrode terminal 130. As a safety mechanism for preventing rotation of the insulation plate 140, the insulation plate 140 may be extended beyond the electrolyte injection through-hole 113, and a through-hole 143 may be formed in the extended insulation plate 140 at a position corresponding to the electrolyte injection through-hole 113. In this case, the plug 115 for sealing the electrolyte injection through-hole 113 may have a pin shape and may be of sufficient length to extend through the through-hole 143, thereby fixing the orientation of the insulation plate 140 with respect to the cap plate 110.

A safety vent 117 may be formed in the cap plate 110, e.g., at a side thereof. The safety vent 117 may include a groove formed to a predetermined depth in the cap plate 110, thereby providing an area of thinner material that can be breached by a predetermined internal pressure if the internal pressure unexpectedly increases. The predetermined internal pressure may be a pressure lower than a critical level, thus allowing the internal pressure to be relieved before, e.g., the battery explodes. The safety vent 117 may also be formed by forming a hole and welding a film of a predetermined thickness over the hole.

The terminal plate 150 may be made of, e.g., a metal such as nickel (Ni) or a Ni alloy, and may be installed along the lower surface of the insulation plate 140. The terminal plate 150 may have a through-hole 151 corresponding to the through-hole 111 of the cap plate 110, in order to accommodate the electrode terminal 130. The electrode terminal 130 may be electrically insulated from the cap plate 110 by the gasket 120, and may be electrically connected to the terminal plate 150.

An insulation case 160 may be installed along the top surface of the electrode assembly 250. The insulation case 160 may cover the top surface of the electrode assembly 250 to electrically insulate the electrode assembly 250 from the cap assembly 100. The insulation case 160 may have two through-holes 163 and 165, in order to allow the first and second electrode taps 215, 225, respectively, to pass through.

The battery may be configured to have the cap plate 110 be thin while having sufficient material to support welding the cap plate 110 to the battery case 200. The cap plate 110 may have different thicknesses in different regions thereof. Referring to FIG. 2, the cap plate 110 may include a rib 110a formed at a periphery thereof. The rib 110a may be thicker than the major area of the cap plate 110. In cross section, the inner surface 110b of the major area of the cap plate 110 may be relieved or recessed with respect to the rib 110a. The different thicknesses may be achieved by any suitable means including, e.g., stamping, bending, machining, etching, etc. The cap plate 110 may be installed such that the outer surface of the major area of the cap plate 110 is even with the end of the battery case 200. The rib 110a may extend perpendicular from the cap plate 110 and may project towards the center of the battery, i.e., downward in FIGS. 1-2.

The major area of the cap plate 110 may have a thickness B that is less than a thickness A of the rib 110a, where the thickness of the rib 110a is considered to include the thickness of the cap plate 110. The thickness B of the major area of cap plate 110 may be less than about 0.8 mm, e.g., between about 0.4 mm and 0.8 mm. The thickness B of the major area of the cap plate 110 may be about 0.6 mm. The thickness A of the rib 110a may be about 0.8 mm to about 0.9 mm. Thus, the interior volume of the battery may be increased by an amount that is proportional to the area of the relieved inner surface 110b and proportional to the difference in thicknesses A-B. Therefore, the battery according to this embodiment of the present invention may provide an increased volume for electrolyte without requiring that the external dimensions, i.e., h, w and/in FIG. 1, be increased and without requiring a reduction in the size of the charge-generating components inside the battery.

Where the battery is a rectangular or prismatic battery, the rib 110*a* may be formed along one or more sides of the cap plate 110. The rib 110*a* may be formed along the whole periphery of the cap plate 110. Where the battery case is round (not shown), the rib may be formed along the whole circumference of the cap plate 110.

Unlike conventional batteries, in which the thickness of the entire cap plate is formed with a uniform, i.e., identical, thickness across the entire area of the cap plate, the battery according to this embodiment of the present invention may have a cap plate 110 with varying thicknesses, i.e., the thickness of the cap plate 110 at the rib 110*a* may be greater than other portions of the cap plate 110, e.g., central portions thereof.

Moreover, the battery according to this embodiment of the present invention may provide a sufficient thickness of material at the rib 110*a* to support welding in this region. In particular, the rib 110*a* may enable an increased welding depth, which may reduce or prevent defects such as holes or gaps, thereby reducing or eliminating the leakage of electrolyte in the region where the cap plate 110 is joined to the battery case 200.

A width C of the rib 110*a* may be determined based on the amount of material required to enable satisfactory welding of the cap plate 110 to the battery case 200. That is, the width C of the rib 110*a* may be large enough to provide a sufficient process margin for welding edges of the cap plate 110 and the battery case 200 together. The rib 110*a* may have a width C of about 1 mm.

The cap plate 110 may include other portions of a greater thickness than the major area of the cap plate 110. For example, a welding reinforcing portion 113*a* may be formed around the electrolyte injection hole 113. The welding reinforcing portion 113*a* may be used to provide additional cap plate material, e.g., metal, around the electrolyte injection hole 113 to enable a welding process there.

In particular, the plug 115 may be welded to the cap plate 110 after the electrolyte is injected into the battery case 200 in order to close off the electrolyte injection hole 113. The plug 115 may be forcibly inserted into the electrolyte injection hole 113. The plug 115 may be formed of, e.g., the same material as the cap plate 110. The thickness of the welding reinforcing portion 113*a*, including the cap plate 110, may be about 0.8 mm to about 0.9 mm. The additional thickness of the welding reinforcing portion 113*a* may help prevent leakage of the electrolyte, which may arise from defects such as small holes or gaps, after the plug 115 and the cap plate 110 are welded together. The welding reinforcing portion 113*a* may be formed with sufficient width to prevent deformation of the cap plate 110 around the circumference of the injection hole 113 when the plug 115 is forcibly inserted.

In a second embodiment of the present invention, the battery case 200 may be relieved to accommodate the cap plate 110, which may ease assembly and enable a sufficiently strong weld between the battery case 200 and the cap plate 110.

The first and second embodiments of the present invention may be used in combination, as illustrated in FIGS. 1 and 2. Referring to FIGS. 1 and 2, the relieved battery case may include a stepped portion 200*a* formed in the upper inside surface of the battery case 200. The height of the stepped portion 200*a* may be A, i.e., substantially the same as the thickness of the rib 110*a*.

Figure 3:
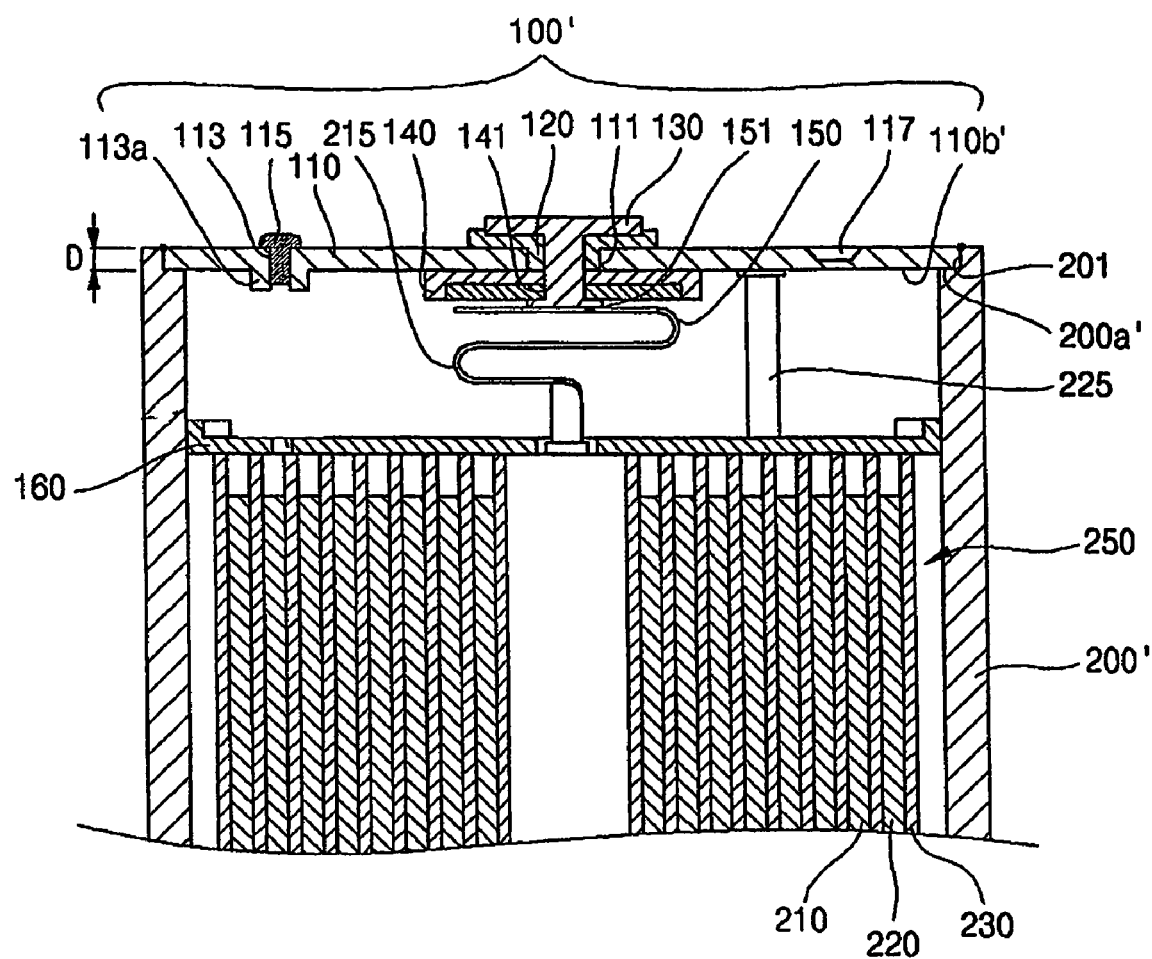
FIG. 3 illustrates a partial cross-section of a battery according to a second embodiment of the present invention.

The second embodiment of the present invention may also be used alone, as illustrated in FIG. 3. Referring to FIG. 3, a battery case 200' may be relieved with a stepped portion 200*a'* to accommodate a cap plate 110' of a cap assembly 100'. The cap plate 110' may be thinner than a conventional cap plate, and the thin major area 110*b'* of the cap plate 110' may extend all the way to the edges of the cap plate 110'. That is, the cap plate 110' may not include a rib at the periphery thereof.

The major area 110*b'* of the cap plate 110', i.e., the thinner area, may have a thickness D of about 0.4 mm to about 0.8 mm. The height of the stepped portion 200*b* formed in an upper inside surface of the battery case 200' may be substantially the same as the thickness B of the cap plate 110.

Procedures for fabricating a battery according to an embodiment of the present invention and having the structure shown in FIGS. 1 and 2 will now be described. Referring to FIGS. 1 and 2, the electrode assembly 250, having the first and second electrode taps 215, 225 extending therefrom, may first be disposed in the battery case 200. Then, the insulation case 160 may be installed on the electrode assembly 250 with the first and second electrode taps 215 and 225 extending through the through-holes 163, 165, respectively.

The electrode terminal 130 may be inserted into the through-hole 111 of the cap plate 110, with the gasket 120 being interposed between the electrode terminal 130 and the cap plate 110. The electrode terminal 130 may be inserted into the through-hole 141 positioned in the center of the insulation plate 140. The insulation plate 140 may be installed along the lower surface of the cap plate 110. The through-hole 143, formed in an extended portion of the insulation plate 140, may be aligned with the electrolyte injection through-hole 113 of the cap plate 110. Then, the terminal plate 150 may be installed along the lower surface of the insulation plate 140, while the electrode terminal 130 is inserted into the through-hole 151. The terminal plate 150 may be connected to the electrode terminal 130.

The cap assembly 100 may be inserted into the opening 201 of the battery case 200 such that the rib 110*a* is disposed along the inside surface of the upper end of the opening of the battery case 200. Where, as illustrated in FIGS. 1 and 2, the battery case includes the relieved stepped portion 200*a*, the rib 110*a* may be in contact with the stepped portion 200*a*. That is, the rib 110*a* of the cap plate 110 may be secured in the step portion 200*a* formed on the upper inside surface of the battery case 200.

The first electrode tap 215 passing through the through-hole 163 of the insulation case 160 may make contact with the terminal plate 150 connected to the electrode terminal 130. The cap plate 110 may be oriented such that the side of the cap plate 110 having the safety vent 117 is disposed near the second electrode tap 225. Upon installation of the cap assembly 110, the lower surface, i.e., inner surface, of the cap plate 110 may make contact with the second electrode tap 225.

Contact portions between the battery case 200 and the cap plate 110 may be welded using, e.g., a laser welding apparatus. The welds at the contact portions of the cap plate 110 may be strengthened by the increased thickness of the cap plate 110 where the rib 110*a* extends downward from the cap plate 110.

The electrolyte may then be injected through the electrolyte injection through-hole 113 into the battery case 200. Subsequently, the electrolyte injection through-hole 113 may be sealed with the plug 115. A pin-shaped plug 115 may be inserted into the electrolyte injection through-hole 113 and may extend through the through-hole 143, so that rotation of the insulation plate 140 can be prevented. The plug 115 may be welded to the cap plate 110 around the electrolyte injection through-hole 113. The welding reinforcing portion 113a that extends downward from the inner surface of the cap plate 110 around the electrolyte injection through-hole 113 may strengthen the weld between the plug 115 and the cap plate 110. Accordingly, the battery according to this embodiment of the present invention may reduce or prevent leakage of the electrolyte from the battery case 200.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery, comprising:
    a case defining a cavity for housing an electrode assembly, the case having an opening for receiving the electrode assembly; and
    a cap plate attached to the case to cover the opening, the cap plate including a welded portion that is thicker than a major area of the cap plate, wherein the welded portion protrudes from an inner surface of the cap plate.

2. The battery as claimed in claim 1, wherein the welded portion is welded to the case.

3. The battery as claimed in claim 2, wherein the welded portion includes a rib formed at an edge of the cap plate, the rib protruding from the inner surface of the cap plate.

4. The battery as claimed in claim 3, wherein an inside surface of the case along the opening has a stepped portion having a predetermined height, and a lower end of the rib is fitted in the stepped portion.

5. The battery as claimed in claim 4, wherein a thickness of the edge having the rib is substantially equal to the predetermined height, such that an upper surface of the cap plate is substantially even with an upper edge of the case.

6. The battery as claimed in claim 3, wherein a thickness of the edge having the rib is within a range of about 0.8 mm to about 0.9 mm.

7. The battery as claimed in claim 3, wherein the cap plate has an electrolyte injection hole and a reinforcing portion formed around a circumference of the electrolyte injection hole, and
    the reinforcing portion protrudes from the inner surface of the cap plate and is thicker than the major area of the cap plate.

8. The battery as claimed in claim 7, wherein a thickness of the reinforcing portion is substantially equal to a thickness of the edge having the rib.

9. The battery as claimed in claim 1, wherein the thickness of a major area of the cap plate is within a range of about 0.4 mm to about 0.8 mm.

10. The battery as claimed in claim 1, wherein the cap plate includes an electrolyte injection hole and the welded portion is welded to a plug sealing the electrolyte injection hole.

11. The battery as claimed in claim 1, wherein the cap plate includes an electrolyte injection hole and a reinforcing portion formed around a circumference of the electrolyte injection hole, the reinforcing portion protrudes from the inner surface of the cap plate, and the reinforcing portion is the welded portion.

12. The battery as claimed in claim 11, wherein an inside surface of the case along the opening has a stepped portion having a predetermined height, an edge of the cap plate is fitted in the stepped portion, and a thickness of the edge of the cap plate is substantially equal to a thickness of the major area of the cap plate.

13. The battery as claimed in claim 1, wherein the case is rectangular.

14. A battery, comprising:
    a case defining a cavity for housing an electrode assembly, the case having an opening for receiving the electrode assembly; and
    a cap plate covering the opening, wherein a thickness of a major area of the cap plate is a predetermined thickness, at least one region of the cap plate has a first thickness greater than the predetermined thickness, the cap plate includes an edge and an electrolyte hole, the edge is welded to the case, and a thickness of the cap plate at the edge is the first thickness, and the cap plate has a ribbed structure formed at the edge, the ribbed structure protruding from the cap plate towards a center of the battery, and a total thickness of the cap plate at the edge is the first thickness.

15. The battery as claimed in claim 14, wherein the case has a recess formed along an inner surface of the case around a circumference of the opening,
    the edge is disposed in the recess, and
    the thickness of the cap plate at the edge is substantially equal to a height of the recess.

16. The battery as claimed in claim 14, wherein the case has a recess formed along an inner surface of the case around a circumference of the opening, a height of the recess being less than the first thickness,
    an edge of the cap plate is disposed in the recess and is welded to the case, and
    a thickness of the cap plate at the edge is substantially equal to the height of the recess.

17. The battery as claimed in claim 16, wherein the thickness of the cap plate at the edge is substantially equal to the predetermined thickness.

18. The battery as claimed in claim 16, wherein the cap plate includes an electrolyte hole and a reinforcing portion formed around a circumference of the electrolyte hole, and
    a thickness of the reinforcing portion is the first thickness.

* * * * *

UNITED STATES PATENT AND TRADEMARK OFFICE
CERTIFICATE OF CORRECTION

PATENT NO. : 7,655,353 B2 Page 1 of 1
APPLICATION NO. : 11/411227
DATED : February 2, 2010
INVENTOR(S) : Teak Hyen Kwon It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 905 days.

Signed and Sealed this

Twenty-third Day of November, 2010

David J. Kappos
*Director of the United States Patent and Trademark Office*